US012644503B2

(12) United States Patent　　　　　(10) Patent No.:　US 12,644,503 B2

Cattoor et al.　　　　　　　　　　　　(45) Date of Patent:　　Jun. 2, 2026

(54) SYSTEMS AND METHOD FOR AN ELECTRIC POWERTRAIN

(71) Applicant: Dana Belgium N.V., Flanders (BE)

(72) Inventors: Kurt Cattoor, Koolkerke (BE); Filip D. Schacht, Meulebeke (BE); Filip Van Raepenbusch, Bruges (BE)

(73) Assignee: DANA BELGIUM, Bruges (BE)

( * ) Notice: Subject to any disclaimer, the term of this patent is extended or adjusted under 35 U.S.C. 154(b) by 133 days.

(21) Appl. No.: 18/640,656

(22) Filed: Apr. 19, 2024

(65) Prior Publication Data

US 2024/0426367 A1　　Dec. 26, 2024

Related U.S. Application Data

(60) Provisional application No. 63/510,244, filed on Jun. 26, 2023.

(51) Int. Cl.
| | |
|---|---|
| *F16H 3/093* | (2006.01) |
| *B60K 1/02* | (2006.01) |
| *B60K 17/08* | (2006.01) |
| *F16H 57/021* | (2012.01) |
| *F16H 57/02* | (2012.01) |

(52) U.S. Cl.
CPC .............. *F16H 3/093* (2013.01); *B60K 1/02* (2013.01); *B60K 17/08* (2013.01); *F16H 57/021* (2013.01); *F16H 2057/02034* (2013.01); *F16H 2057/02043* (2013.01); *F16H 2200/0021* (2013.01); *F16H 2200/0043* (2013.01)

(58) Field of Classification Search
CPC ................... F16H 3/093; F16H 57/021; F16H 2057/02034; F16H 2057/02043; F16H 2200/0021; F16H 2200/0043; F16H 2003/0818; F16H 2003/0931; F16H 2003/008; F16H 2003/0936; F16H 3/091; B60K 1/02; B60K 17/08
See application file for complete search history.

(56) References Cited

U.S. PATENT DOCUMENTS

| | | | |
|---|---|---|---|
| 7,798,931 B2 | 9/2010 | Earhart | |
| 11,312,218 B2 * | 4/2022 | Serrao | .................... B60K 17/02 |
| 12,337,844 B2 * | 6/2025 | Brolles | .................... B60K 1/02 |
| 2021/0379978 A1 * | 12/2021 | Van Dingenen | ....... B60K 25/00 |

FOREIGN PATENT DOCUMENTS

| | | |
|---|---|---|
| CN | 101169175 A | 4/2008 |
| DE | 102011084623 A1 | 4/2013 |
| KR | 101610506 B1 | 4/2016 |
| WO | 2020078596 A1 | 4/2020 |

* cited by examiner

*Primary Examiner* — Victor L Macarthur
(74) *Attorney, Agent, or Firm* — McCoy Russell LLP

(57) ABSTRACT

Systems and a method are provided for a transmission system. In one example, a multi-speed transmission includes an input shaft driven by two parallel electric motors, the input shaft comprising a first gear and a second gear, a first clutch shaft comprising a first clutch engaged with the first gear, a second clutch shaft comprising a second clutch engaged with the second gear, a fourth clutch shaft comprising a fourth clutch engaged with the second clutch, the fourth clutch shaft further comprising a fourth clutch shaft first gear engaged with a first clutch shaft gear arranged on the first clutch shaft, and a third clutch arranged on the input shaft, the third clutch engaged with a second clutch shaft gear.

5 Claims, 3 Drawing Sheets

SYSTEMS AND METHOD FOR AN ELECTRIC POWERTRAIN

CROSS REFERENCE TO RELATED APPLICATION

The present application claims priority to U.S. Provisional Application No. 63/510,244, entitled "SYSTEMS AND METHOD FOR AN ELECTRIC POWERTRAIN", and filed on Jun. 26, 2023. The entire contents of the above-listed application are hereby incorporated by reference for all purposes.

TECHNICAL FIELD

The present description relates generally to a transmission of a vehicle.

BACKGROUND AND SUMMARY

As the proliferation of vehicle electrification continues, changes to vehicle components are demanded to accommodate new vehicle architectures. For example, transmissions may need multiple gear trains to accommodate torque transfer from one or more electric motors. Packaging of a multi-gear train transmission may present certain challenges as packaging space available in vehicles continues to be reduced.

Thus, a demand for a transmission with multiple gear trains and a reduced packaging size is desired. In one example, the issues described above may be addressed by a multi-speed transmission including an input shaft driven by two parallel electric motors, the input shaft comprising a first gear and a second gear, a first clutch shaft comprising a first clutch engaged with the first gear, a second clutch shaft comprising a second clutch engaged with the second gear, a fourth clutch shaft comprising a fourth clutch engaged with the second clutch, the fourth clutch shaft further comprising a first fourth clutch shaft gear engaged with a first clutch shaft gear arranged on the first clutch shaft, and a third clutch arranged on the input shaft, the third clutch engaged with a second clutch shaft gear.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

The above, as well as other advantages of the present disclosure, will become readily apparent to those skilled in the art from the following detailed description when considered in light of the accompanying drawings in which.

DETAILED DESCRIPTION

Figure 1:
FIG. 1 is a schematic depiction of an example vehicle, according to an embodiment of the present disclosure.
Figure 2:
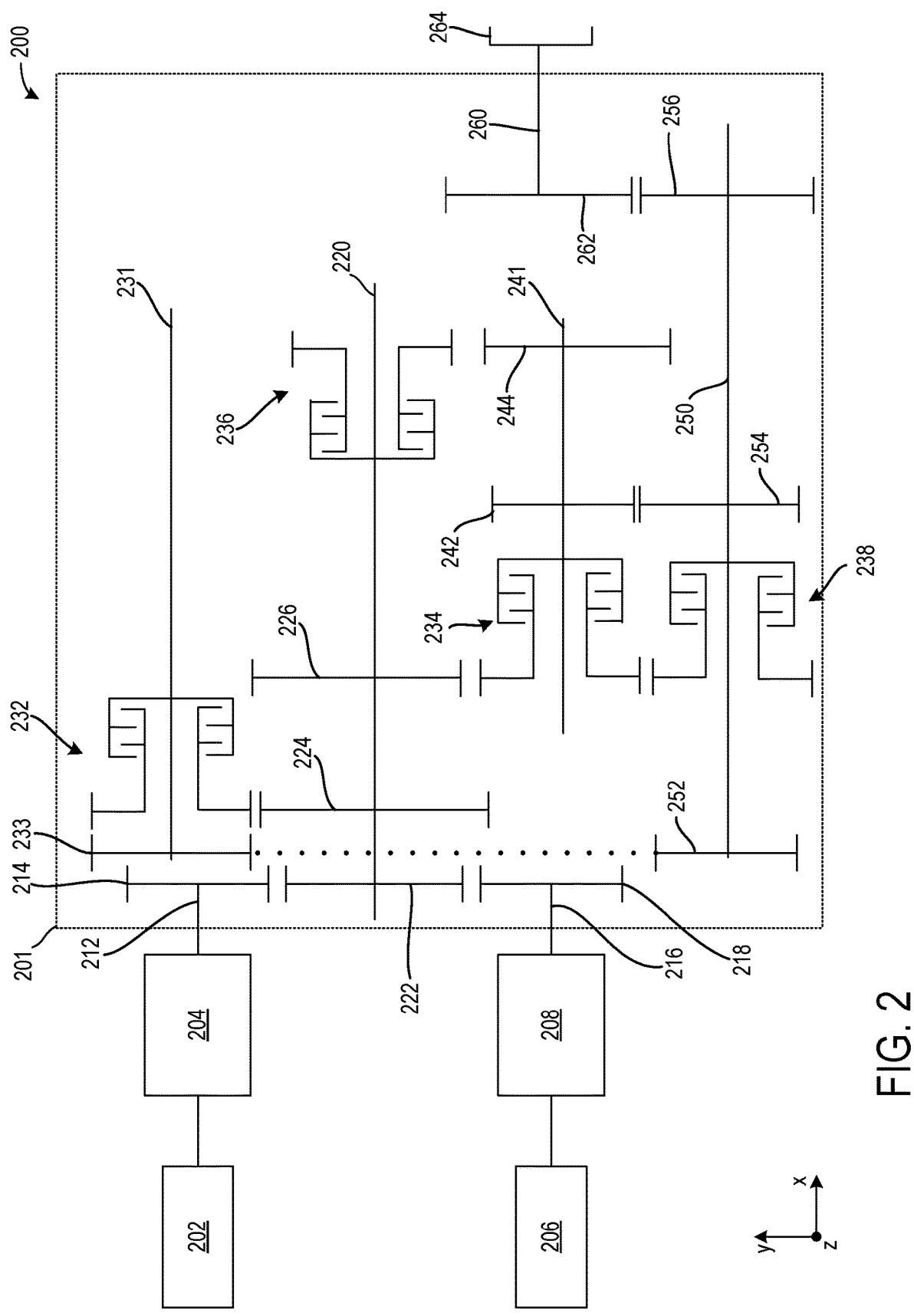
FIG. 2 is an embodiment of a transmission of the vehicle, according to an embodiment of the present disclosure.
Figure 3:
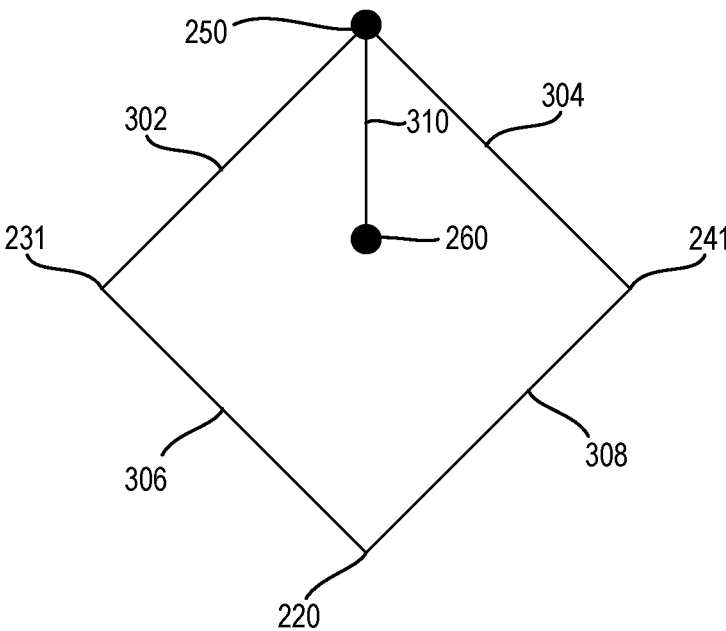
FIG. 3 is an embodiment of a layout of the transmission.
Figure 3:
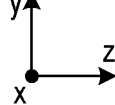

The following description relates to a transmission. In one example, the transmission is a multi-speed transmission, as shown in FIG. 1. FIG. 2 illustrates an embodiment of a transmission of the vehicle. FIG. 3 illustrates an embodiment of a layout of the transmission.

FIGS. 1-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

In one example, the disclosure provides support for a transmission coupled to at least one electric motor. In one example, two electric motors are configured to drive a counter shaft transmission with a double drum assembly. The transmission may be used in a vehicle. The vehicle may be a heavy-duty vehicle, a light-duty vehicle, an off-highway vehicle, or other vehicle. In some examples, it may be desired to execute a relatively high torque multiplication in first gear, such as 1:25. An input gear of the transmission may be configured to reduce the speed provided by the electric motors, which may decrease a speed differential across the clutches of the transmission. The input ratio and the output ratio of the transmission may limit a demanded reduction between the input shaft and the two clutch shafts comprising a total of four clutches, two clutches on each of the clutch shafts. As such, a size of the gears included in the transmission may be reduced, which may decrease a packaging size of the transmission. The double clutch arrangement may further decrease a number of gear engagements and increase efficiency of the system. This may increase a longevity of the transmission and decrease service requests. Additionally or alternatively, a centerline of the input and output shafts may be substantially parallel to one another. In one example, substantially parallel may be defined as two lines with primary vectors extending in a single direction.

The transmission may be a multi-speed transmission comprising a plurality of shafts, gears, clutches, and bearings. The configuration of the components of the transmission may allow four distinct speeds to be achieved.

Turning now to FIG. 1, a vehicle 100 is shown comprising a powertrain 101 and a drivetrain 103. The powertrain comprises a prime mover 106 and a transmission 108. The prime mover 106 may be an electric motor, for example, and is operated to provide rotary power to the transmission 108. The transmission 108 may be any type of transmission, such as a manual transmission, an automatic transmission, or a continuously variable transmission. The transmission 108 receives the rotary power produced by the prime mover 106 as an input and outputs rotary power to the drivetrain 103 in accordance with a selected gear or setting.

In one example, the prime mover 106 is a first prime mover 106 and the vehicle 100 may further include a second prime mover 107. The first prime mover 106 may be different than the second prime mover 107 in size and configuration. Each of the first prime mover 106 and the second prime mover 107 may be coupled to an energy storage device. The energy storage device may be a battery, a fuel tank, or other similar device. A charge of fuel volume of the energy storage device may be monitored via a sensor or estimated based on vehicle operating conditions. In one example, one or more of the first prime mover 106 and the second prime mover 107 may be configured to replenish a charge of the energy storage device during a generator operation.

In one example, the first prime mover 106 and the second prime mover 107 are electric machines coupled to an energy storage system including a plurality of battery cells. Inverters may be configured to control electrical power provided to corresponding electric machines. In this way, each of the first prime mover 106 and the second prime mover 107 is an electric machine.

The vehicle 100 may be a commercial vehicle, light, medium, or heavy duty vehicle, a passenger vehicle, an off-highway vehicle, and sport utility vehicle. Additionally or alternatively, the vehicle 100 and/or one or more of its components may be in industrial, locomotive, military, agricultural, and aerospace applications.

In some examples, such as shown in FIG. 1, the drivetrain 103 includes a first axle assembly 102 and a second axle assembly 112. The first axle assembly 102 may be configured to drive a first set of wheels 104, and the second axle assembly 112 may be configured to drive a second set of wheels 114. In one example, the first axle assembly 102 is arranged near a front of the vehicle 100 and thereby comprises a front axle, and the second axle assembly 112 is arranged near a rear of the vehicle 100 and thereby comprises a rear axle. The drivetrain 103 is shown in a four-wheel drive configuration, although other configurations are possible. For example, the drivetrain 103 may include a front-wheel drive, a rear-wheel drive, or an all-wheel drive configuration. Further, the drivetrain 103 may include one or more tandem axle assemblies. As such, the drivetrain 103 may have other configurations without departing from the scope of this disclosure, and the configuration shown in FIG. 1 is provided for illustration, not limitation. Further, the vehicle 100 may include additional wheels that are not coupled to the drivetrain 103.

In some four-wheel drive configurations, such as shown in FIG. 1, the drivetrain 103 includes a transfer case 110 configured to receive rotary power output by the transmission 108. A first driveshaft 113 is drivingly coupled to a first output 111 of the transfer case 110, while a second driveshaft 122 is drivingly coupled to a second output 121 of the transfer case 110. The first driveshaft 113 (e.g., a front driveshaft) transmits rotary power from the transfer case 110 to a first differential 116 of the first axle assembly 102 to drive the first set of wheels 104, while the second driveshaft 122 (e.g., a rear driveshaft) transmits the rotary power from the transfer case 110 to a second differential 126 of the second axle assembly 112 to drive the second set of wheels 114. For example, the first differential 116 is drivingly coupled to a first set of axle shafts 118 coupled to the first set of wheels 104, and the second differential 126 is drivingly coupled to a second set of axle shafts 128 coupled to the second set of wheels 114. It may be appreciated that each of the first set of axle shafts 118 and the second set of axle shafts 128 may be positioned in a housing.

The vehicle 100 may further include a control system 184. Control system 184 is shown comprising a controller 182 receiving information from a plurality of sensors 186 and sending control signals to a plurality of actuators 188. The controller 182 may receive input data from the various sensors, process the input data, and trigger the actuators in response to the processed input data based on instruction or code programmed therein corresponding to one or more routines. The plurality of sensors 186 may include speed sensors, temperature sensors, humidity sensors, location sensors, accelerometers, and the like. The plurality of actuators 188 may be actuators of one more valves, motors, and other devices.

Turning now to FIG. 2, it shows a transmission assembly 200. The transmission assembly 200 may be included in vehicle 100 of FIG. 1. In one example, the transmission assembly 200 is a non-limiting example of the transmission 108 of FIG. 1. The transmission assembly 200 may be a multi-speed transmission. In one example, the transmission assembly 200 is a two-speed transmission.

An axis system is shown comprising an x-axis, a y-axis normal to the x-axis, and a z-axis normal to each of the x- and y-axes. In one example, the x-axis is parallel to a horizontal direction, the y-axis is parallel to a vertical axis, and the z-axis is parallel to a transverse direction.

A first inverter 202 is electrically coupled to a first electric motor 204. A second inverter 206 is electrically coupled to a second electric motor 208. The first inverter 202 and the second inverter 206 may be configured to transfer power from an energy storage device to the first electric motor 204 and the second electric motor 208, respectively.

The first electric motor 204 may include a first output shaft 212 on which a first electric motor output gear 214 is arranged. The first electric motor output gear 214 is coupled to and rotates with the first output shaft 212. The second electric motor 208 may include a second output shaft 216 on which a second electric motor output gear 218 is arranged. The second electric motor output gear 218 is coupled to and rotates with the second output shaft 216. In one embodiment, the first electric motor 204 and the second electric motor 208 may be sized identically. In some examples, additionally or alternatively, the first electric motor 204 may be a different size than the second electric motor 208. In one example, the first electric motor output gear 214 is shaped and sized identically to the second electric motor output gear 218. In some examples, additionally or alternatively, the first electric motor output gear 214 is shaped and/or sized differently than the second electric motor output gear 218.

An input gear 222 may be arranged on and coupled to an input shaft 220. The input gear 222 may be in meshed engagement with each of the first electric motor output gear 214 and the second electric motor output gear 218. In one example, each of the first electric motor output gear 214, the second electric motor output gear 218, and the input gear 222 are arranged within a transmission casing 201. A boundary of the transmission casing 201 is illustrated via a dashed box. As such, each of the first output shaft 212 and the second output shaft 216 may extend in a direction parallel to the x-axis and through a surface of the transmission casing 201 into an interior volume of the transmission casing 201.

The input gear 222 may rotate the input shaft 220. A first gear 224 may be arranged on and coupled to the input shaft 220. A second gear 226 may be arranged on and coupled to the input shaft 220. Each of the first gear 224 and the second gear 226 may rotate as the input shaft 220 rotates. In one example, the first gear 224 is arranged closer to the input gear 222 than the second gear 226.

The first gear 224 may be in meshed engagement with a gear of a first clutch 232 arranged on a first clutch shaft 231. The first clutch 232 may control power transfer from the first gear 224 to the first clutch shaft 231. A first clutch shaft gear 233 may rotate when the first clutch shaft 231 rotates. The first clutch shaft 231 may be parallel to each of the first output shaft 212 and the second output shaft 216.

The second gear 226 may be in meshed engagement with a gear of a second clutch 234. The second clutch 234 may control power transfer from the second gear 226 to a second clutch shaft 241. A second clutch shaft first gear 242 and a second clutch shaft second gear 244 may be arranged on the second clutch shaft 241.

A third clutch 236 may be arranged on the input shaft 220. A gear of the third clutch 236 may be in meshed engagement with the second clutch shaft second gear 244. The third clutch 236 may control power transfer from the input shaft 220 to the second clutch shaft second gear 244. In one example, the input shaft 220 may be interchangeably referred to as a third shaft.

The second clutch 234 may include a gear in meshed engagement with a gear of a fourth clutch 238. The fourth clutch 238 may be arranged on a fourth clutch shaft 250. In one example, the fourth clutch 238 may be control power transfer from the second clutch 234 to the fourth clutch shaft 250.

A fourth clutch shaft first gear 252 may be in meshed engagement with the first clutch shaft gear 233. As such, when the first clutch 232 is locked (e.g., closed) and power is transferred from the first gear 224, through the first clutch 232, and to the first clutch shaft gear 233, the fourth clutch shaft first gear 252 may rotate, and therefore rotate the fourth clutch shaft 250 at a first speed. In one example, each of the second clutch 234, the third clutch 236, and the fourth clutch 238 are open when the first clutch 232 is closed.

The fourth clutch shaft 250 may rotate at a second speed when the second clutch 234 is closed (e.g., locked) and one or more of the first clutch 232, the third clutch 236, and the fourth clutch 238 are/is open. In this configuration, the second clutch shaft 241 rotates via power transferred from the second gear 224 to the second clutch 234. The second clutch shaft 241 may rotate the second clutch shaft first gear 242, which rotates the fourth clutch shaft second gear 254 via a meshed engagement. In one example, each of the first clutch 232, the third clutch 236, and the fourth clutch are open when the second clutch 234 is closed.

The fourth clutch shaft 250 may rotate at a third speed when the third clutch 236 is closed and one or more of the first clutch 232, the second clutch 234, and the fourth clutch 238 is/are open. The third clutch 236 may transfer power from the input shaft 220 to the second clutch shaft second gear 244. The second clutch shaft second gear 244 may rotate the second clutch shaft 241, which rotates the second clutch shaft first gear 242. The second clutch shaft first gear 242 rotates the fourth clutch shaft second gear 254. In one example, each of the first clutch 232, the second clutch 234, and the fourth clutch 238 are open when the third clutch 236 is closed.

The fourth clutch shaft 250 may rotate at a fourth speed when the fourth clutch 238 is closed and one or more of the first clutch 232, the second clutch 234, and the third clutch 236 is/are open. In this configuration, a gear of the second clutch 234, which is meshed with and rotated by the second gear 226, transfers power to a gear of the fourth clutch 238, wherein the fourth clutch 238 transfers power to the fourth clutch shaft 250. In one example, the first clutch 232, the second clutch 234, and the third clutch 236 are open when the fourth clutch 238 is closed.

In one example, each of the first speed, the second speed, the third speed, and the fourth speed are distinct speeds. In this way, the example of FIG. 2 illustrates a four-speed transmission. In one example, each of the first clutch 232, the second clutch 234, the third clutch 236, and the fourth clutch 238 is a wet clutch comprising a gear, a hub, a plurality of friction plates coupled to the hub, a plurality of separator plates selectively couplable to the plurality of friction plates via actuation of a piston based on a force of hydraulic fluid and a spring force. Each of the first clutch 232, the second clutch 234, the third clutch 236, and the fourth clutch 238 may be configured to transfer power or suspend power transfer. In one example, each of the speeds includes only one of the clutches in a closed position and the other clutches in an open position. As such, for each speed, only one of the clutches is transferring power and the remaining clutches block (e.g., suspend) power transfer.

A fourth clutch shaft third gear 256 may rotate based on the rotation of the fourth clutch shaft 250. The fourth clutch shaft third gear 256 may be in meshed engagement with an output shaft gear 262 arranged on an output shaft 260. The output shaft 260 may output power to an output member 264. Additionally or alternatively, the output shaft 260 may output power directly to a wheel or to a differential.

In one example, each of the first clutch shaft 231, the second clutch shaft 241, and the fourth clutch shaft 250 rotates when the transmission 200 is operating. For example, when the first speed is generated, the first clutch 232 is closed and the first clutch shaft 231 is rotated via rotation provided by the gear of the first clutch 232. When the third speed is generated, the third clutch 236 is closed, which may result in the first clutch shaft 231 rotating via a meshed engagement between the fourth clutch shaft first gear 252 and the first clutch shaft gear 233. However, rotation of the first clutch shaft 231 when the third speed is generated may not impact the third speed.

Turning now to FIG. 3, it shows an example layout 300 of the transmission 200. As illustrated in the layout 300, the fourth clutch shaft 250 and the output shaft 260 are parallel to the x-axis. In one example, additionally or alternatively, fourth clutch shaft 250 and the output shaft 260 may include a vector that extends parallel to the x-axis. In the examples of FIGS. 2 and 3, each of the shafts of the transmission 200 and the electric motors may be parallel to or include a vector that extends parallel to the x-axis. As such, the first output shaft 212, the second output shaft 216, the input shaft 220, the first clutch shaft 231, the second clutch shaft 241, the fourth clutch shaft 250, and the output shaft 260 are parallel to one another and the x-axis.

The example layout 300 illustrates gear interactions via lines. Shafts are arranged at intersections between the lines. Angles of the lines may be representative of the angles of the gears in the arrangement of the transmission 200 arranged in a drivetrain of a vehicle. Line 302 illustrates an interaction between first clutch shaft gear 233 and the fourth clutch shaft first gear 252. Line 304 illustrates an interaction between the second clutch shaft first gear 242 and the fourth clutch shaft second gear 254. Additionally or alternatively, line 304 illustrates an interaction between the second clutch 234 and the fourth clutch 238. Line 306 illustrates an interaction between the first gear 224 and the gear of the first clutch 232. Line 308 illustrates an interaction between the second gear 226 and the gear of the second clutch 234. Additionally or alternatively, line 308 illustrates an interaction between the gear of the third clutch 236 and the second clutch shaft second gear 244. Line 310 illustrates an interaction between the third fourth clutch shaft gear 250 with an output gear 262 of the output shaft 260.

In one example, the transmission includes a plurality of shafts, a plurality of clutches, and a plurality of gears arranged in the transmission casing, wherein each of the plurality of shafts is parallel to an axis. The plurality of gears may be arranged at an angle relative to the axis, wherein the angle is between 0 and 90 degrees. In one example, the angle is less than 90 degrees and greater than 0 degrees. The plurality of shafts and the plurality of gears may be arranged in a diamond or a square configuration.

The disclosure provides support for a multi-speed transmission including an input shaft driven by two parallel electric motors, the input shaft comprising a first gear and a second gear, a first clutch shaft comprising a first clutch, a second clutch shaft comprising a second clutch, a fourth clutch shaft comprising a fourth clutch meshed with the second clutch, the fourth clutch shaft further comprising a fourth clutch shaft first gear meshed with a first clutch shaft gear arranged on the first clutch shaft and a fourth clutch shaft second gear meshed with a second clutch shaft first gear, and a third clutch arranged on the input shaft, the third clutch meshed with a second clutch shaft second gear. A first example of the multi-speed transmission further includes where an output shaft comprises a primary vector that is parallel to primary vectors of shafts extending from the two electric motors to the input shaft. A second example of the multi-speed transmission, optionally including the first example, further includes where the input shaft, the first clutch shaft, the second clutch shaft, and the fourth clutch shaft are parallel to one another and the output shaft. A third example of the multi-speed transmission, optionally including one or more of the previous examples, further includes where each of the input shaft, the first clutch shaft, the second clutch shaft, and the fourth clutch shaft rotate when at least one of the first clutch, the second clutch, the third clutch, or the fourth clutch is closed. A fourth example of the multi-speed transmission, optionally including one or more of the previous examples, further includes where the first gear is in meshed engagement with a gear of the first clutch. A fifth example of the multi-speed transmission, optionally including one or more of the previous examples, further includes where the second gear is in meshed engagement with a gear of the second clutch.

The disclosure provides additional support for a system including a multi-speed transmission comprising a transmission casing that houses a plurality of clutches and a plurality of gears arranged on a plurality of shafts, wherein the plurality of shafts is parallel to an axis, and wherein the plurality of gears is arranged at an angle to the axis between 0 and 90 degrees. A first example of the system further includes a first electric motor comprising a first output shaft and a second electric motor comprising a second output shaft, wherein the first output shaft and the second output shaft are parallel to the axis. A second example of the system, optionally including the first example, further includes where the first output shaft and the second output shaft extend into the transmission casing, and wherein the first output shaft comprises a first electric motor output gear and the second output shaft comprises a second electric motor output gear arranged within the transmission casing and meshed with an input gear arranged on an input shaft of the multi-speed transmission. A third example of the system, optionally including one or more of the previous examples, further includes where the plurality of clutches comprises a first clutch arranged on a first shaft, a second clutch arranged on a second shaft, a third clutch arranged on a third shaft, and a fourth clutch arranged on a fourth shaft. A fourth example of the system, optionally including one or more of the previous examples, further includes where the plurality of shafts is arranged in a diamond configuration. A fifth example of the system, optionally including one or more of the previous examples, further includes an output shaft parallel to the axis. A sixth example of the system, optionally including one or more of the previous examples, further includes where the output shaft extends from the transmission casing to an output member outside the transmission casing. A seventh example of the system, optionally including one or more of the previous examples, further includes where each of the plurality of shafts comprises at least one clutch of the plurality of clutches and at least one gear of the plurality of gears arranged thereon. An eighth example of the system, optionally including one or more of the previous examples, further includes where the at least one gear of each of the plurality of shafts is coupled to either a clutch gear or a gear of another of the plurality of shafts.

The disclosure provides further support for a system for a multi-speed transmission including an input shaft comprising an input gear driven by output gears of two electric motors, a first gear on the input shaft meshed with a first clutch, and a second gear on the input shaft meshed with a second clutch, a first shaft comprising the first clutch and a first clutch shaft gear, a second shaft comprising the second clutch, a second clutch shaft first gear, and a second clutch shaft second gear, wherein the second clutch shaft second gear is meshed with a third clutch arranged on the input shaft, a fourth shaft comprising a fourth clutch, a fourth clutch shaft first gear, a fourth clutch shaft second gear, and a fourth clutch shaft third gear, wherein the fourth clutch shaft first gear is meshed with the first clutch shaft gear, the fourth clutch shaft second gear is meshed with the second clutch shaft first gear, and the fourth clutch is meshed with the second clutch, and an output gear on an output shaft, the output gear meshed with the fourth clutch shaft third gear; wherein the input shaft, the first shaft, the second shaft, the fourth shaft, and the output shaft are parallel to an axis. A first example of the system further includes where gears of the first shaft, the second shaft, the input shaft, and the fourth shaft are angled less than 90 degrees to the axis. A second example of the system, optionally including the first example, further includes where only output shafts of the two electric motors and the output shaft extend outside of a transmission casing, wherein the output shafts of the two electric motors are parallel to the axis. A third example of the system, optionally including one or more of the previous examples, further includes where the fourth clutch is arranged between the fourth clutch shaft first gear and the fourth clutch shaft second gear. A fourth example of the system, optionally including one or more of the previous examples, further includes where the multi-speed transmission is a four-speed transmission.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for a multi-speed transmission, comprising:
an input shaft comprising an input gear driven by output gears of two electric motors, a first gear on the input shaft meshed with a first clutch, and a second gear on the input shaft meshed with a second clutch;
a first shaft comprising the first clutch and a first clutch shaft gear;
a second shaft comprising the second clutch, a second clutch shaft first gear, and a second clutch shaft second gear, wherein the second clutch shaft second gear is meshed with a third clutch arranged on the input shaft;
a fourth shaft comprising a fourth clutch, a fourth clutch shaft first gear, a fourth clutch shaft second gear, and a fourth clutch shaft third gear, wherein the fourth clutch shaft first gear is meshed with the first clutch shaft gear, the fourth clutch shaft second gear is meshed with the second clutch shaft first gear, and the fourth clutch is meshed with the second clutch; and
an output gear on an output shaft, the output gear meshed with the fourth clutch shaft third gear; wherein
the input shaft, the first shaft, the second shaft, the fourth shaft, and the output shaft are parallel to an axis.

2. The system of claim 1, wherein gears of the first shaft, the second shaft, the input shaft, and the fourth shaft are angled less than 90 degrees to the axis.

3. The system of claim 1, wherein only output shafts of the two electric motors and the output shaft extend outside of a transmission casing, wherein the output shafts of the two electric motors are parallel to the axis.

4. The system of claim 1, wherein the fourth clutch is arranged between the fourth clutch shaft first gear and the fourth clutch shaft second gear.

5. The system of claim 1, wherein the multi-speed transmission is a four-speed transmission.

* * * * *